(12) United States Patent
Cramaro

(10) Patent No.: US 6,616,211 B2
(45) Date of Patent: Sep. 9, 2003

(54) TARPAULIN TENSIONING ARRANGEMENT

(75) Inventor: Michael Cramaro, Indian Harbor Beach, FL (US)

(73) Assignee: Cramaro Terpaulin Systems, Inc., Newark, DE (US)

( * ) Notice: Subject to any disclaimer, the term of this patent is extended or adjusted under 35 U.S.C. 154(b) by 0 days.

(21) Appl. No.: 10/263,852

(22) Filed: Oct. 3, 2002

(65) Prior Publication Data

US 2003/0067186 A1 Apr. 10, 2003

Related U.S. Application Data

(60) Provisional application No. 60/327,905, filed on Oct. 9, 2001.

(51) Int. Cl.[7] .................................................. B60P 7/04
(52) U.S. Cl. ............................ 296/100.15; 296/100.12; 296/105
(58) Field of Search ....................... 296/100.12, 100.15, 296/100.18, 107.12, 105

(56) References Cited

U.S. PATENT DOCUMENTS 5,538,313 A * 7/1996 Henning ................ 296/100.12
5,924,759 A * 7/1999 DeMonte et al. ...... 296/100.12
6,511,117 B1 * 1/2003 Henning ................ 296/100.15
2002/0167193 A1 * 11/2002 Fliege et al. ................ 296/105

FOREIGN PATENT DOCUMENTS

| FR | 2593126 A1 | * | 7/1978 |
| GB | 2199549 A | * | 7/1988 |
| JP | 405050858 A | * | 9/1993 |

* cited by examiner

*Primary Examiner*—Stephen T. Gordon
*Assistant Examiner*—Jason Morrow
(74) *Attorney, Agent, or Firm*—Connolly Bove Lodge & Hutz, LLP

(57) ABSTRACT

A tarpaulin tensioning arrangement includes a lever or leg mounted at one end to a framework extension. A crank having a threaded end is threadably engaged to the lever. The framework is moved to a tightened condition by rotating the crank until the lever or leg is engaged with a catch to hold one end of the lever or leg in a fixed position. Continued rotation of the crank causes the framework extension to move in a tensioning direction.

14 Claims, 5 Drawing Sheets

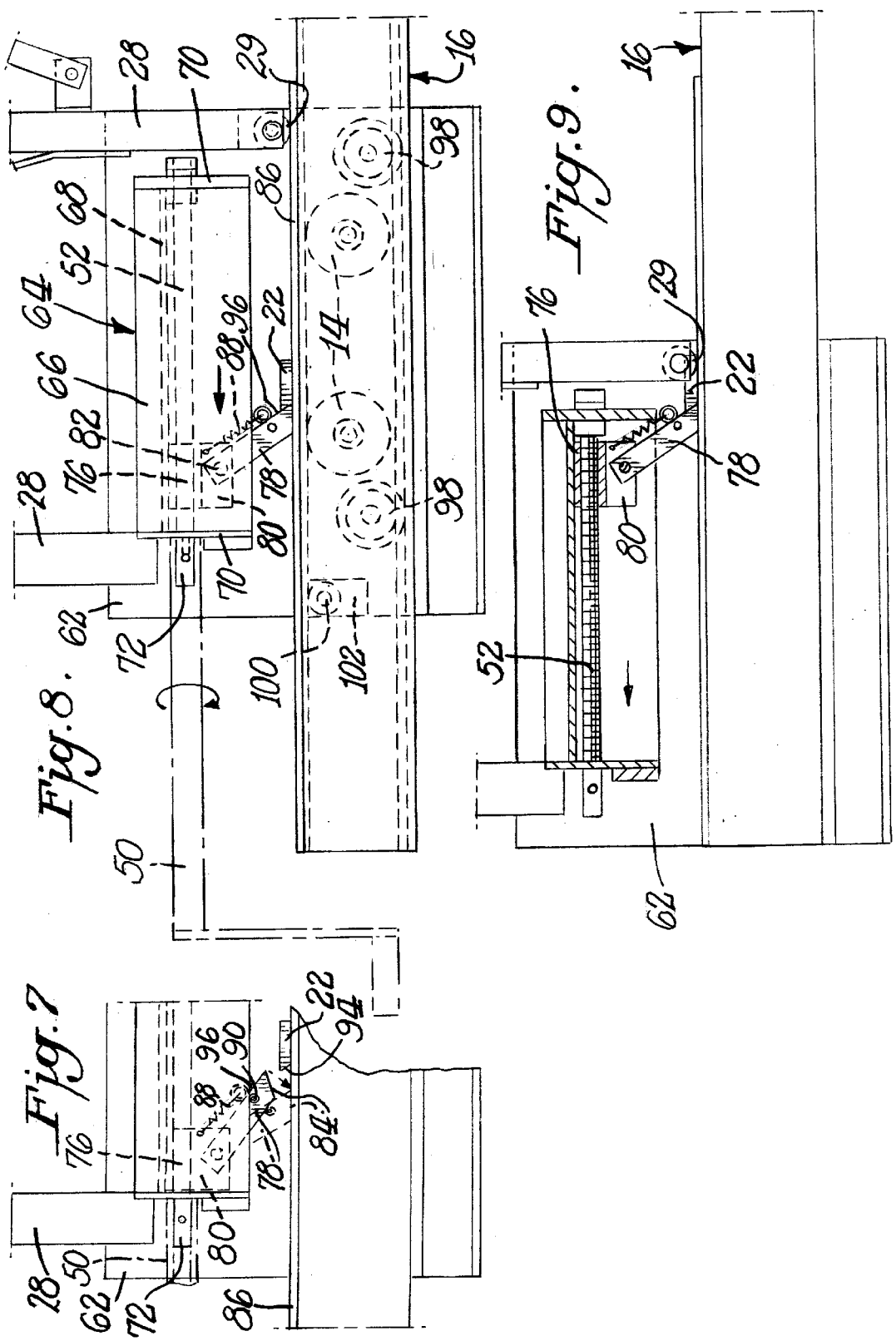

TARPAULIN TENSIONING ARRANGEMENT

CROSS-REFERENCE TO RELATED APPLICATION

This application is based upon provisional application Serial No. 60/327,905, filed Oct. 9, 2001.

BACKGROUND OF THE INVENTION

Various tarpaulin systems exist for selectively covering and uncovering the body of a truck or other vehicle. One form of arrangement commercially marketed under the trademark TARP-ALL® by Cramaro Tarpaulin Systems includes a framework mounted to the body of the vehicle. The framework carries a tarpaulin and is slidably movable along the length of the vehicle body to selectively cover and uncover the vehicle body. When the framework is extended in the covering position the tarpaulin is stretched over the vehicle body. It would be desirable if a tensioning arrangement could be provided to assure the desired extension of the tarpaulin.

SUMMARY OF THE INVENTION

An object of this invention is to provide a tarpaulin tensioning arrangement for tensioning a tarpaulin which is selectively moved to and from covering and uncovering positions.

A further object of this invention is to provide such a tensioning arrangement which can be easily operated and can be manufactured at low cost.

In accordance with this invention the framework is provided with a lock arm which is selectively locked to the end of the framework base. A lever is mounted to the lock arm and is pivotally mounted to the frame extension which carries the tarpaulin. A crank engaged with the lever causes the lever to move toward or away from the rear of the framework in accordance with the direction of movement of the crank. Thus, in one direction of movement the crank causes the lever to move in a generally counterclockwise direction which in turn causes the frame extension to move outwardly toward the rear of the vehicle thereby tensioning the tarpaulin.

THE DRAWINGS

FIG. 7 is a side elevational view of a portion of the tensioning arrangement shown in FIGS. 5–6; and FIGS. 8–9 are side elevational views showing the tensioning arrangement of FIGS. 5–7 in different phases of operation.

DETAILED DESCRIPTION

Figure 1:
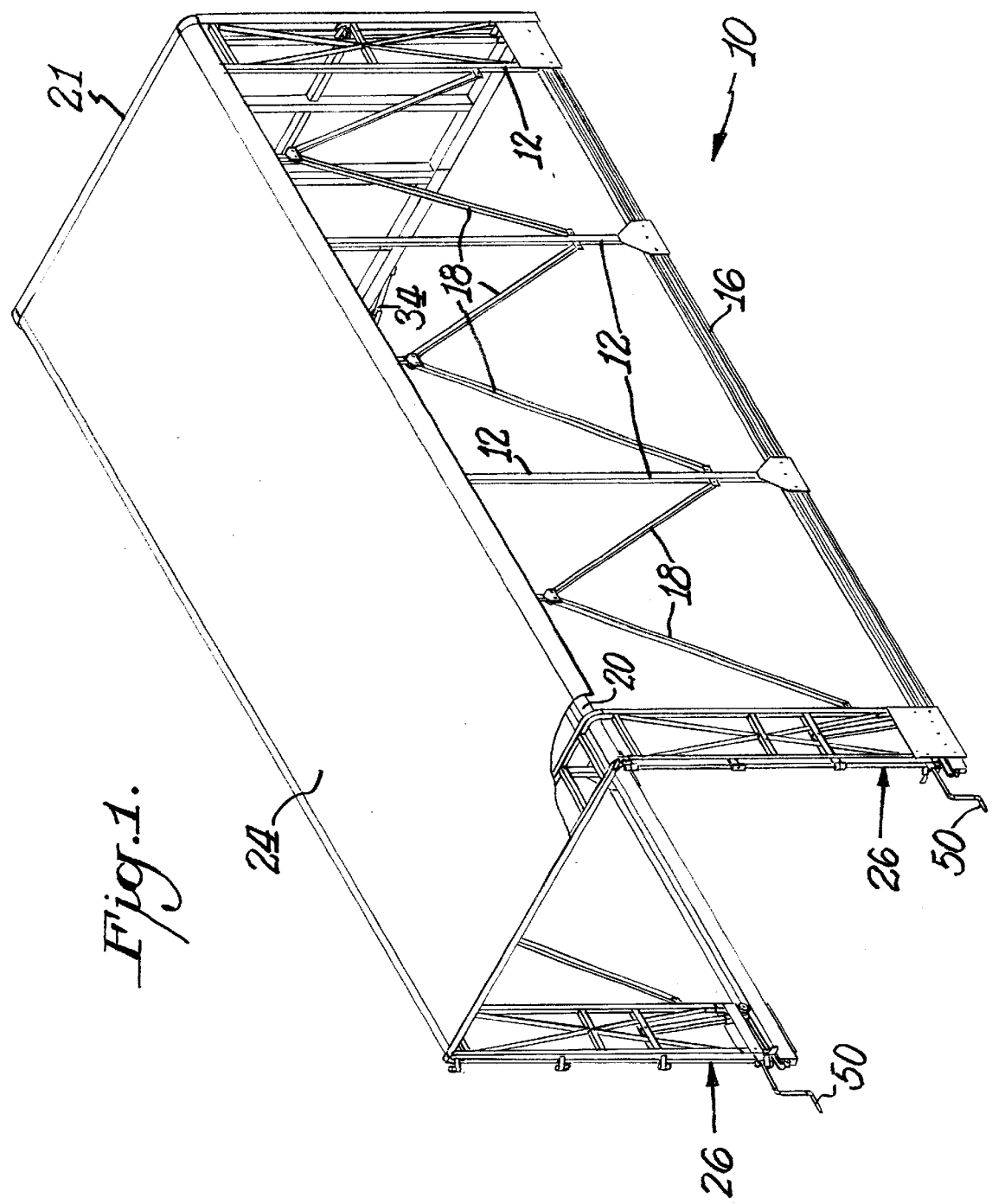
FIG. 1 is a perspective view of a tarpaulin cover system which includes the tensioning arrangement of this invention in the tensioned condition.

FIG. 1 illustrates a tarpaulin covering system 10 which would be mounted to a truck body to selectively cover and uncover the truck body. The illustrated tarpaulin cover system is of the type marketed under the trademark TARP-ALL® by Cramaro Tarpaulin Systems. The TARP-ALL® cover has found particular usefulness for flatbed vehicles. For example, flatbed hauling could result in items perched over 8 feet above the vehicle deck and often in very inclement weather. This could lead to items falling off the load as well as posing problems with weight, danger and difficulty using hand tarpaulins. It has been found, however, that by use of the TARP-ALL® covers for flatbed trailers the load could be covered or uncovered on a 48 foot flatbed in less than 5 minutes. In the uncovered condition the tarpaulin is moved in accordion fashion to the front end of the vehicle. In the covered condition one end of the tarpaulin remains anchored at the front end of the vehicle while the remainder of the tarpaulin moves toward the rear end of the vehicle. To achieve the maximum benefits of the system the tarpaulin should be in a tensioned condition when in its fully covered position with an end of the tarpaulin mounted at the rear end of the vehicle. Although the present invention is particularly effective when incorporated in the TARP-ALL® system, it is to be understood that the principles of this invention may be used for other systems. Reference is made to the illustrated system in order to provide an understanding of the invention.

As shown in FIG. 1 the covering system 10 includes a framework having a series of vertical bars 12 provided with rollers 14 (see FIGS. 3–4) on their lower end to ride in tracks 16 mounted to the truck body. The rollers or pulleys 14 are enclosed in U-shaped tracks 16 so as to be shielded during their movement as well as assuring maintaining the rollers in their proper position. Intermediate reinforcement members 18 are pivotally mounted to the vertical bars 12 and the upper horizontal bars 20 in any suitable manner. The framework is actuated in any suitable means, such as manually or by a motor operated drive to slide toward and away from the front bulkhead at the front end of the framework. A tarpaulin 24 made of any suitable material, such as vinyl, completely covers the top and sides of the framework. The tarpaulin is made of a flexible material so that the framework may move in accordion fashion toward and away from the front bulkhead at its front end 21 depending on whether it is desired to cover or uncover the vehicle body.

When the tarpaulin cover system 10 is in its covering position it is desirable if the tarpaulin could be tensioned to assure a proper covering of the vehicle body. The present invention provides a tensioning arrangement 26 on each side of the framework in the covering system 10.

The various figures illustrate the components of tensioning arrangement 26. In general, the tensioning arrangement includes a framework extension in the form of a pair of vertical support members 28,28. A pair of cross pieces 30,30 is mounted across the support members 28,28. The base 32 of the framework extension is located at the rear portion of the system 10. As shown in FIG. 1, the front portion may include manual locking bars 34 on each side of the framework to hold the framework at the front bulkhead. The locking bars 34 can be opened to allow the frame to be detached from the bulkhead and slide toward the rear of the system. When locked in the front position, however, the tensioning arrangement 26 would be utilized for tensioning the tarpaulin 24.

Figure 2:
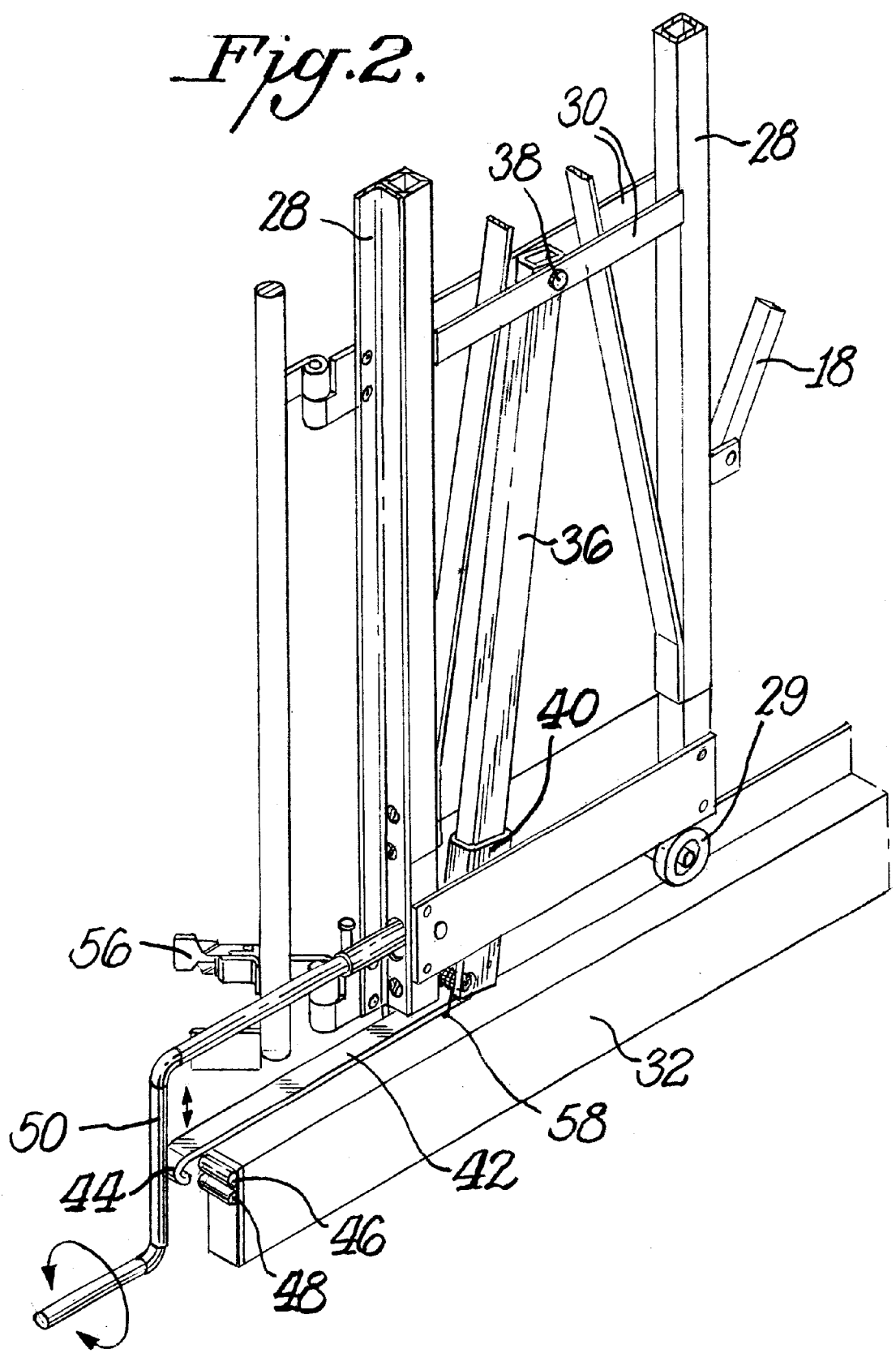
FIG. 2 is a perspective view of a portion of the tarpaulin tensioning arrangement shown in FIG. 1 in the untensioned condition.
Figure 3:
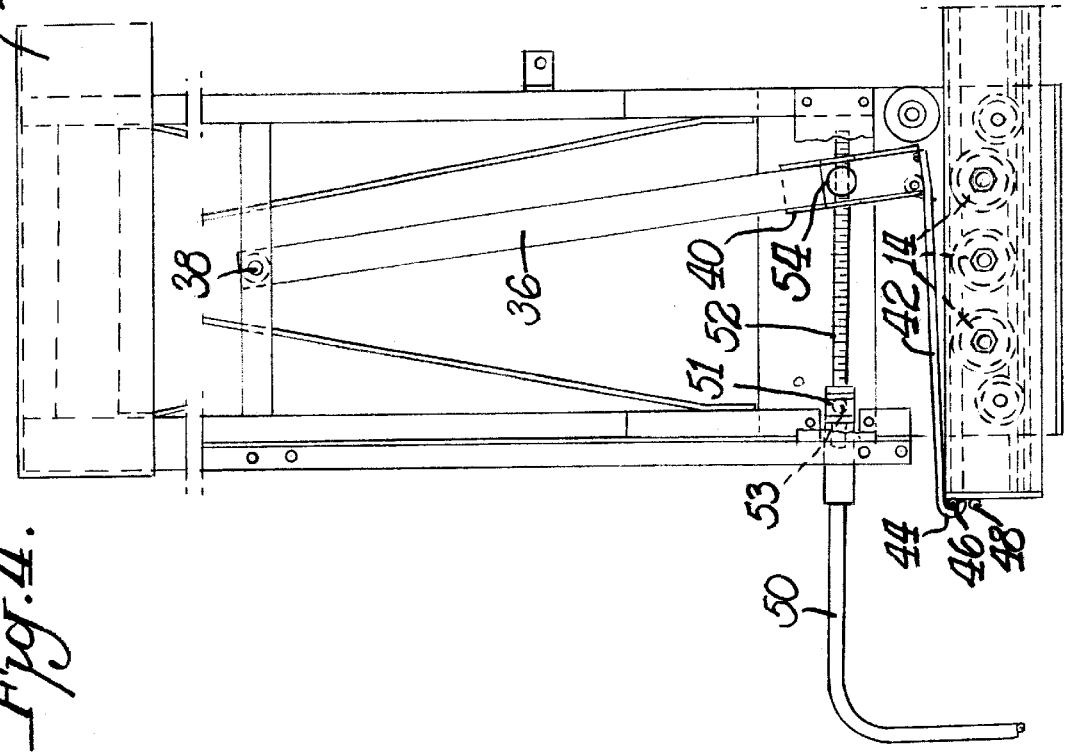
FIGS. 3 and 4 are fragmental side elevational views showing the tarpaulin tensioning arrangement in the released and tensioned or tightened positions, respectively.
Figure 4:
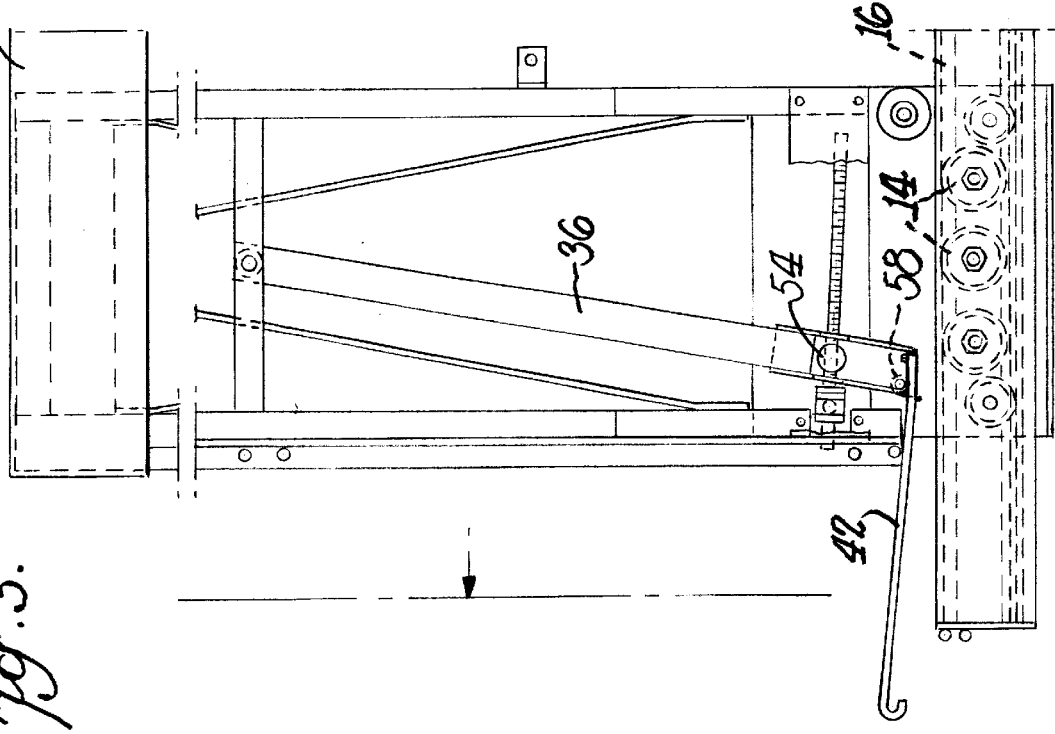

As illustrated in FIGS. 2–4, a lever 36 is mounted between cross-pieces 30,30 at one end by a pivot pin 38. The lower end of lever 36 is mounted in a sleeve 40 which in turn is secured at its lower end to a lock arm 42 which may be a generally flat member having a hook end 44. A pair of generally cylindrical members 46,48 is provided at the rear end of base 32. The hook end 44 of lock arm 42 may be pivoted downwardly to catch over upper member 46 thereby holding lock arm 42 in place. A crank 50 has a threaded lead end 52 engaged in a threaded nut 54 on sleeve 40.

Crank 50 may be detachable in any suitable manner, such as by means of a coupler 51 pivotally connecting the handle end of the crank to its threaded end 52.

Torsion spring 58 presses against the lock arm 42 to urge the lock arm in a position where its hook end 44 is in the upward position shown in FIG. 3. When it is desired to tension the tarp 24, the lock arm 42 is pushed downwardly to lower the hook end 44. The crank 50 is then rotated and the tightening process begins. Lead screw end 52 rotates in nut 54. The lever 36 is thereby caused to rotate about pivot pin 38 carrying the lock arm 42 with the lever 36. The lever 36 thereby moves in a counterclockwise direction toward the position shown in FIG. 4. As the lever 36 moves in a counterclockwise direction the depressed hook 44 becomes engaged between catch elements 46,48. Lock arm 42 is thereby restrained from further counterclockwise or lateral movement. This thereby fixes the location of the lower end of lever 36 which is mounted to lock arm 42. Continued rotation of crank 50 causes the coupler 51 to push the screw end 52 further through nut 54. The lever 36 now pivots about its fixed lower end with the upper end at pivot pin 38 moving in a counterclockwise direction. This pivotal movement of lever 36 is accomplished while nut 54 remains engaged with screw end 52 because of the pivotal mounting of coupler 51. The counterclockwise movement of the upper end of lever 38 continues until the arrangement is in the tightened condition shown in FIG. 4.

At least one of the vertical members 28 on each side of the cover system is provided with a roller 29 which rides above track 16 to facilitate the sliding movement of the extension as it moves between the released and tightened positions.

The same operation would be performed for each tensioning mechanism on each side of the cover system 10 at the rear of the system.

After the extension has been moved to its tightened position locking bars 56 would be rotated in a clockwise direction from that shown in FIG. 2 to maintain the extension locked against further slidable movement in either direction. When it is desired to release the tightening mechanism, locking bar 56 would be rotated in the counterclockwise direction.

The system is preferably operated by a detachable manual crank 50. If desired, a motorized mechanism could be incorporated in the system to move the system to and from its released and tightened positions.

When it is desired to move the covering system 10 to its uncovered condition, crank 50 would be rotated in a clockwise direction thereby reversing the movement of the lever 36 from the position shown in FIG. 4 to the position shown in FIG. 3. This reverse movement would cause the hook 44 of lock arm 42 to be detached from catch 46 and permit the entire system to move in accordion fashion to a collapsed condition.

Crank 50 with its handle and with its coupler 51 and its threaded end 52 may be considered as a transmission assembly. Other forms of structure, however, may be used such as a slidably mounted abutment member which would push against lever 36.

FIGS. 5–9 show a further practice of the invention with the tensioning arrangement 60. As with the embodiment of FIGS. 1–4, a tensioning arrangement 60 would be located on each side of the cover system similar to the location of tensioning arrangements 26. Each tensioning arrangement would be independently manipulated.

Figure 5:
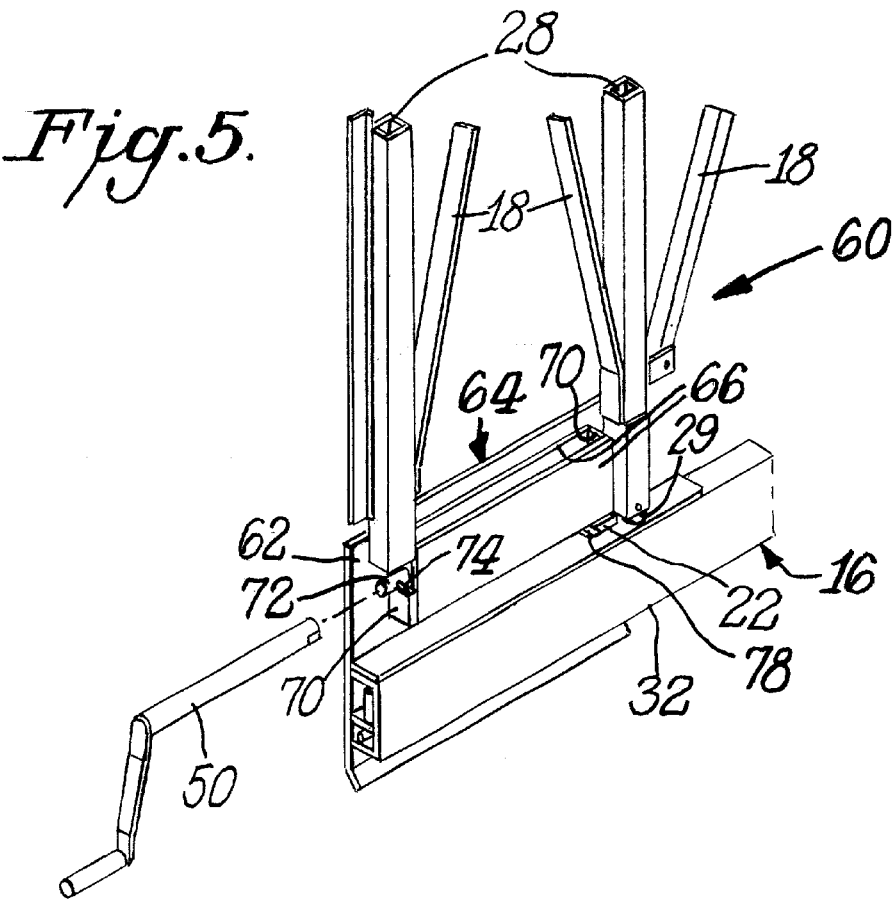
FIG. 5 is a perspective view of an alternative tensioning arrangement in accordance with a further embodiment of this invention.
Figure 6:
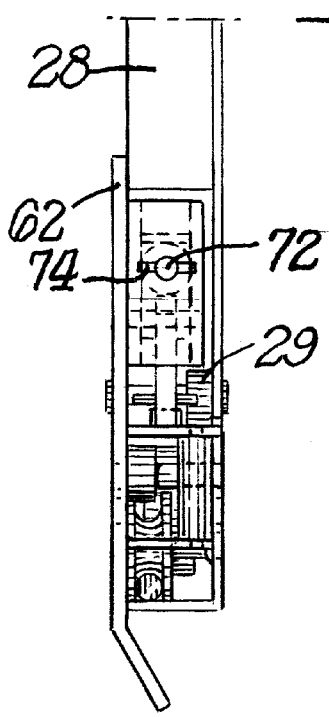
FIG. 6 is a front elevational view of the arrangement shown in FIG. 5.

As shown in FIG. 5 the tensioning arrangement 60 would be mounted to the vertical members 28 in the framework of the cover system. As previously described various support structure such as cross struts 18 would also be included in the framework. The tensioning arrangement 60 would be mounted to the endmost vertical members 28,28 at the rear end of the vehicle and would operate in conjunction with track 16.

Tensioning arrangement 60 includes a support plate 62 mounted to vertical members 28 and extending below the base 32 of the framework which forms part of track 16. As illustrated in FIG. 8 a plurality of rollers is mounted to support plate 62 to ride in track 16. A roller 29 is mounted at the lower end of one of the vertical members 28 as shown in FIGS. 5, 8 and 9.

The tensioning arrangement 60 includes a housing 64 located above track 16. Housing 64 is formed by a pair of spaced parallel side plates 66,66 interconnected by a cross plate 68 located slightly below the upper surfaces of side plates 66,66. Housing 64 also includes a pair of end walls 70,70 which further interconnect the side plates 66,66. The bottom of housing 64 is open as later described.

A threaded shaft 52 is rotatably mounted within housing 64 by being rotatably supported in any suitable manner in end walls 70,70. As illustrated, an end 72 of shaft 52 extends outwardly from housing 64. End 72 is detachably coupled to crank 50 so that by turning crank 50, shaft 52 is rotated in either a clockwise or counterclockwise direction depending on the direction of rotation of crank 50. Any suitable manner of connection between crank 50 and end 72 may be used such as by locking pin 74.

As best shown in FIGS. 7–9 a carriage 76 is threadably engaged with shaft 52 by means of a threaded longitudinal passage in carriage 76 being threadably coupled with the outer threaded surface of shaft 52. A lever or leg 78 is pivotally mounted between extension plates 80 which extend downwardly from carriage 76. Pivotal mounting is achieved through pivot pin 82 secured to plates 80 and extending through an opening in leg 78. Leg 78 preferably is tapered at its lower end to form a lower surface 84 which would rest flat against the upper surface 86 of track 16. A spring 88 mounted to leg 78 and to carriage 76 urges leg 78 upwardly in a counterclockwise direction. Abutments, such as a pin 90 extending completely through leg 78 a sufficient distance to extend beyond plates 66,66 limit the upward movement of leg 78 as shown in FIG. 7.

A catch 22 is mounted in a fixed position to the top surface 86 of track or rail 16. One end 94 of catch 22 is tapered to conform to the angle of edge 96 of leg 78 when lower surface 84 of leg 78 is disposed against upper surface 86 of rail 16. Catch 22 may be a block or plate terminating at one end in edge 94 or may contain an elongated slot wherein an edge similar to edge 94 would be located as one of the slot ends. Although the drawings illustrate the preferred form for catch 22 it is to be understood that other structural members may be used located at any location as long as the structural member functions as a stop in the path of motion of leg 78 so that when leg 78 contacts the stop the leg will be restrained from further movement.

In operation crank 50 would be mounted to end 72 of threaded shaft 52. Leg 78 would be pushed manually by finger pressure downwardly from the position shown in solid in FIG. 7 to the position shown in phantom where edge 84 is disposed against upper surface 86 of rail 16. While leg 78 is held in this downward position shown in phantom in FIG. 7 crank 50 would be rotated to move carriage 76 toward the front of the vehicle. The movement would continue until edge 96 of leg 78 is disposed against edge 94 of catch 22. Because catch 22 is in a fixed position, the lower end of leg 78 is prevented from further longitudinal movement. This, in turn, prevents longitudinal movement of carriage 76. At this point of operation, the components of tensioning system 60 are in the position shown in FIG. 8.

Because catch 22 prevents carriage 76 from moving, continued rotation of crank 50 results in moving the tensioning arrangement toward the rear of the truck until the cover system is completely tensioned as shown in FIG. 9.

Crank 50, shaft 52 and carriage 76 may be considered as a transmission assembly for initially moving leg 78 longitudinally toward the front of the vehicle until leg 78 contacts catch 22 which prevents further movement of leg 78. The transmission assembly then causes housing 64, plate 62 and the endmost vertical members 28 of the cover framework to move toward the rear of the vehicle to tension the cover or tarpaulin.

When the tarpaulin is tightened there would be tendency for the end of the cover system located near the rear of the vehicle to tilt in a clockwise direction. The present invention takes measures to avoid or minimize such tendency to tilt. This is achieved by the provision of various rollers to relieve the pressure from the pulleys and track. A roller or cam follower 29, for example, is provided at the lower end of one of the vertical members 28. In addition to the guide rollers or pulleys 98 rollers 14 function as additional load bearing rollers as shown in FIG. 8. Similarly, as also shown in FIG. 8 a load bearing roller or cam follower 100 is disposed against the upper portion of track 16. As illustrated in FIG. 5 a bracket 102 is provided to support both sides of the cam follower 100.

As can be appreciated the tensioning mechanism could be provided at the end of any arrangement where it is desired to move a portion of a system, such as a framework, and wherein the movement is a sliding movement. The preferred practice of the invention is to have this sliding movement result in a tensioning such as the tensioning of a tarpaulin. The concepts, however, may be practiced in other types of environments. What the invention provides is an automatic movement which results simply by turning a shaft such as the treaded end of a crank wherein the turning or rotating motion in one direction causes a lever or leg to be engaged so that its lower end is locked in a fixed position whereby continued rotation then causes movement to effect the extension or tightening. Conversely, a reverse rotation automatically results in an opposite or relaxed condition and in the automatic disengagement of the lever or leg.

What is claimed is:

1. A tensioning system comprising a movable framework, a housing mounted to said framework, a leg pivotally mounted to said housing, a catch mounted in a fixed position, said leg being movable to a position for abutting against said catch, a transmission assembly for moving said leg until said leg engages said catch and then for moving said housing and said framework in a direction opposite the initial direction of movement of said leg.

2. The system of claim 1 wherein said transmission assembly includes a carriage movably mounted in said housing in a longitudinal direction on a transmission member, said housing having an open bottom, and said leg being pivotally mounted to said carriage and extending outwardly beyond said open bottom of said housing.

3. The system of claim 2 wherein said housing has an end wall remote from said transmission assembly, said transmission assembly further including a crank having a handle and a threaded end, said transmission member being said threaded end, said carriage having a threaded passageway threadably engaged with said threaded end, and said threaded end being mounted to said end wall of said housing.

4. The system of claim 3 wherein said framework is slidably mounted on a track, said track having an upper surface, and said catch being mounted on said upper surface.

5. The system of claim 4 wherein said leg has a tapered lower end for making surface to surface contact with said upper surface of said track when said leg is in its locking condition.

6. The system of claim 5 wherein said leg includes an inclined lead edge when said leg is in said locking condition, and said catch having a tapered lead edge of a complementary taper to said inclined lead edge of said leg.

7. The system of claim 1 wherein a plate is mounted to said framework across a pair of vertical members of said framework, and said housing being mounted to said plate.

8. The system of claim 1 wherein said leg is resiliently mounted to a position out of locking engagement with said catch whereby said leg must be moved to its locking position.

9. The system of claim 8 including a stop member located in the path of motion of said leg to limit the pivotal movement of said leg in response to said leg being resiliently mounted.

10. The system of claim 1 wherein said framework is part of a tarpaulin mounting system secured to a vehicle, said framework being located on opposite sides of said vehicle, a tarpaulin mounted to said framework, said tarpaulin being anchored at one longitudinal end of said framework, and said tarpaulin being secured to said tensioning system at the opposite longitudinal end of said framework.

11. The system of claim 10 wherein a pair of said tensioning systems is mounted on opposite sides of the vehicle.

12. The system of claim 11 including locking bars mounted to said framework to maintain said tensioning system in a locked condition for preventing further slidable movement of said tensioning system.

13. The system of claim 1 wherein said tensioning system is mounted on at least one roller which rides in a track to facilitate the sliding movement of said tensioning system.

14. The system of claim 13 wherein said framework rides on a track mounted to the vehicle, said track being in the form of a rail having an upper portion spaced from a lower portion, rollers mounted in said track between said upper portion and said lower portion of said track to function as bearing rollers, a first cam follower disposed against said upper portion of said track, and a second cam follower mounted disposed against and under said upper portion.

* * * * *